United States Patent
Alarfaj et al.

(10) Patent No.: US 12,392,236 B2
(45) Date of Patent: Aug. 19, 2025

(54) PIPE DRIFTING IN WELLS

(71) Applicant: Saudi Arabian Oil Company, Dhahran (SA)

(72) Inventors: Abdullrohman Khaled Alarfaj, Dammam (SA); Ali Al-Shaikh, Dhahran (SA); Mohammad Abdullah Alkhateeb, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 375 days.

(21) Appl. No.: 18/171,947

(22) Filed: Feb. 21, 2023

(65) Prior Publication Data

US 2024/0280013 A1  Aug. 22, 2024

(51) Int. Cl.
*E21B 47/08* (2012.01)
*G01B 5/12* (2006.01)

(52) U.S. Cl.
CPC ............... *E21B 47/08* (2013.01); *G01B 5/12* (2013.01)

(58) Field of Classification Search
CPC .................................. E21B 47/08; G01B 5/12
USPC ................................................ 33/544, 555.1
See application file for complete search history.

(56) References Cited

U.S. PATENT DOCUMENTS

| | | | | |
|---|---|---|---|---|
| 3,977,468 A * | 8/1976 | Brewer | ............. | G01B 5/12 166/241.5 |
| 4,798,246 A * | 1/1989 | Best | ............. | B08B 9/0436 166/173 |
| 6,065,219 A * | 5/2000 | Murphey | ............. | G01V 1/52 33/304 |
| 7,884,951 B2 * | 2/2011 | Prouvost | ............. | E21B 47/08 356/625 |
| 9,605,938 B2 * | 3/2017 | Helmore | ............. | G01B 3/56 |
| 10,982,976 B2 * | 4/2021 | Albrecht | ............. | G01B 3/26 |
| 11,555,395 B2 * | 1/2023 | Perrin | ............. | E21B 47/0025 |

(Continued)

FOREIGN PATENT DOCUMENTS

| | | |
|---|---|---|
| CN | 204113225 | 1/2015 |
| CN | 204532267 | 8/2015 |

OTHER PUBLICATIONS

Bellani et al., "Pipe drift estimation based on the measurements of geometrical parameters from a single pipe," presented at the European Safety and Reliability Conference and 15th Probabilistic Safety Assessment and Management Conference, Venice, Italy, Nov. 1-5, 2020, 8 pages.

(Continued)

*Primary Examiner* — George B Bennett
(74) *Attorney, Agent, or Firm* — Fish & Richardson P.C.

(57) ABSTRACT

A drift bar is lowered into a well. The drift bar has a density that is less than a density of a wellbore fluid residing in the well. A tubular is lowered into the well below a surface level of the wellbore fluid residing in the well. The tubular defines an inner bore having an inner diameter that is greater than an outer diameter of the drift bar. The drift bar is positioned to pass through the inner bore of the tubular as the tubular is lowered into the well. After the tubular is positioned below the surface level, an absence or presence of the drift bar floating at the surface level is detected. An absence or presence of a restriction in the inner bore of the tubular is determined in response to detecting the presence or absence, respectively, of the drift bar floating at the surface level.

20 Claims, 8 Drawing Sheets

(56) References Cited

U.S. PATENT DOCUMENTS

| | | | |
|---|---|---|---|
| 11,574,250 B2* | 2/2023 | Quader | G06F 40/18 |
| 12,054,999 B2* | 8/2024 | Al-Mousa | E21B 37/02 |
| 2024/0141777 A1* | 5/2024 | Alerigi | E21B 47/098 |
| 2024/0309752 A1* | 9/2024 | Chery | G01B 5/30 |

OTHER PUBLICATIONS

Corbin et al., "An Industry-First 7-5/8 in. Drill Pipe Like Tubular Facilitates Deep Offshore Completions and Interventions by Saving Time and Reducing Cost," presented at the SPE/IADC Drilling Conference and Exhibition, The Hague, The Netherlands, Mar. 14-16, 2017, 21 pages.

Moumin, "Geothermal Well Design," Djibouti: United Nations University, 2013, 32 pages.

* cited by examiner

FIG. 4C

PIPE DRIFTING IN WELLS

TECHNICAL FIELD

This disclosure relates to pipe drifting, and in particular, pipe drifting in downhole applications.

BACKGROUND

In oil and gas well operations, downhole tools and casing strings may need to be run through an already installed casing. A pipe's drift diameter is the inner diameter that a pipe manufacturer guarantees per specifications. The pipe's drift diameter is different from the pipe's nominal inner diameter. The pipe's drift diameter is slightly larger than the pipe's nominal inner diameter. A well planner can use the pipe's drift diameter to determine which size tools and/or casing strings can be later run through an already installed casing. The pipe's nominal inner diameter can be used to determine fluid volume calculations, such as calculations relating to mud circulation and cement slurry placement. A pipe drifting operation is an operation that checks the pipe's drift diameter to ensure that the drift diameter of the pipe is sufficiently large for installation in a particular well.

SUMMARY

This disclosure describes technologies relating to pipe drifting in wells. Certain aspects of the subject matter described can be implemented as a method. A drift bar is lowered into a well formed in a subterranean formation. The drift bar has a density that is less than a density of a wellbore fluid residing in the well. A tubular is lowered into the well below a surface level of the wellbore fluid residing in the well. The tubular defines an inner bore having an inner diameter that is greater than an outer diameter of the drift bar. The drift bar is positioned to pass through the inner bore of the tubular as the tubular is lowered into the well. After the tubular is positioned below the surface level, an absence or presence of the drift bar floating at the surface level is detected. After the tubular is positioned below the surface level, it is detected whether the drift bar is absent (not floating) or present (floating) at the surface level. An absence or presence of a restriction in the inner bore of the tubular is determined in response to detecting the presence or absence, respectively, of the drift bar floating at the surface level. For example, it is determined that a restriction in the inner bore of the tubular is absent if the drift bar is present (floating) at the surface level. As another example, it is determined that a restriction in the inner bore of the tubular is present if the drift bar is absent (not floating) at the surface level.

This, and other aspects, can include one or more of the following features. The tubular can be pulled out of the well in response to determining the presence of the restriction in the inner bore of the tubular. The drift bar can be removed from the tubular. The drift bar can be replaced in the well. The inner diameter of the inner bore of the tubular can be about 0.25 inches greater than the outer diameter of the drift bar, such that a clearance between the inner bore and the drift bar while the drift bar is positioned within the inner bore is about 0.125 inches. The restriction in the inner bore of the tubular can have a dimension less than or equal to the outer diameter of the drift bar, such that the restriction prevents passage of the drift bar. The drift bar can be made of a ceramic material encasing a buoyancy fluid. The buoyancy fluid can have a density that is less than the density of the wellbore fluid residing in the well. The drift bar can be formed by encasing the buoyancy fluid within the ceramic material. The buoyancy fluid can include air. The ceramic material can include zirconia, alumina, silicon nitride, or any combinations of these.

Certain aspects of the subject matter described can be implemented as a method. A drift bar is placed in a well formed in a subterranean formation. The drift bar has a density that is less than a density of a wellbore fluid residing in the well, such that the drift bar tends to float at a surface level in the well. A tubular is placed in the well below the surface level. The tubular defines an inner bore having an inner diameter that is greater than an outer diameter of the drift bar. The drift bar is positioned to pass through the inner bore of the tubular as the tubular is placed in the well. After the tubular is positioned below the surface level, an absence of the drift bar at the surface level is detected. That is, it is detected that the drift bar is not floating at the surface level. A presence of a restriction in the inner bore of the tubular is determined in response to detecting the absence of the drift bar floating at the surface level. After determining the presence of the restriction in the inner bore of the tubular, the tubular is pulled out of the well. The drift bar is removed from the tubular. The drift bar is replaced in the well.

This, and other aspects, can include one or more of the following features. The inner diameter of the inner bore of the tubular can be about 0.25 inches greater than the outer diameter of the drift bar, such that a clearance between the inner bore and the drift bar while the drift bar is positioned within the inner bore is about 0.125 inches. The restriction in the inner bore of the tubular can have a dimension that is less than or equal to the outer diameter of the drift bar, such that the restriction prevents passage of the drift bar. The drift bar can be made of a ceramic material encasing a buoyancy fluid. The buoyancy fluid can have a density that is less than the density of the wellbore fluid residing in the well. The drift bar can be formed by encasing the buoyancy fluid within the ceramic material. The buoyancy fluid can include air. The ceramic material can include zirconia, alumina, silicon nitride, or any combinations of these.

Certain aspects of the subject matter described can be implemented as a method. A drift bar is lowered to a downhole location within a well formed in a subterranean formation. The well is at least partially filled with a wellbore fluid. The drift bar has a density that is less than a density of the wellbore fluid. A tubular is lowered into the well through the wellbore fluid. The tubular defines an inner bore sized to allow the drift bar to rise in an uphole direction through the wellbore fluid within the tubular to a wellbore fluid level within the well. After lowering the tubular, a presence of the drift bar floating at the wellbore fluid level is detected. An absence of a restriction in the inner bore of the tubular is determined in response to detecting the presence of the drift bar floating at the wellbore fluid level. After determining the absence of the restriction in the inner bore of the tubular, a second tubular is lowered into the well through the wellbore fluid. The second tubular defines a second inner bore that is sized to allow the drift bar to rise in the uphole direction through the wellbore fluid within the second tubular to the wellbore fluid level within the well.

This, and other aspects, can include one or more of the following features. The inner diameter of the inner bore of the tubular can be about 0.25 inches greater than the outer diameter of the drift bar, such that a clearance between the inner bore and the drift bar while the drift bar is positioned within the inner bore is about 0.125 inches. The inner diameter of the second inner bore of the second tubular can be about 0.25 inches greater than the outer diameter of the drift bar, such that a second clearance between the second inner bore and the drift bar while the drift bar is positioned within the second inner bore is about 0.125 inches. The drift bar can be made of a ceramic material encasing a buoyancy fluid. The buoyancy fluid can have a density that is less than the density of the wellbore fluid residing in the well. The drift bar can be formed by encasing the buoyancy fluid within the ceramic material. The buoyancy fluid can include air. The ceramic material can include zirconia, alumina, silicon nitride, or any combinations of these. After lowering the second tubular, an absence or presence of the drift bar floating at the wellbore fluid level can be detected. For example, after lowering the second tubular, it can be detected whether the drift bar is absent (not floating) or present (floating) at the wellbore fluid level. An absence or presence of a second restriction in the second inner bore of the second tubular can be determined in response to detecting the presence or absence, respectively, of the drift bar floating at the wellbore fluid level. For example, it can be determined that a second restriction in the second inner bore of the second tubular is absent if the drift bar is present (floating) at the wellbore fluid level. As another example, it can be determined that a second restriction in the second inner bore of the second tubular is present if the drift bar is absent (not floating) at the wellbore fluid level.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes pipe drifting in wells. A drift bar has a density that is less than the wellbore fluid residing in the well. Because the drift bar has a lower density, the drift bar tends to float on the surface of the wellbore fluid. The drift bar is first placed in the wellbore, and then tubing is installed in the wellbore. If the inner diameter is sufficiently large through the length of the tubing, the drift bar passes through the inner bore of the tubing without getting trapped. After the tubing has been fully deployed, the drift bar should remain floating on the drilling fluid. If, however, a restriction with insufficient inner diameter exists in the tubing (for example, by an obstruction), the drift bar remains trapped in the tubing due to the restriction. In such cases, the drift bar will not remain floating on the surface of the wellbore fluid after the tubing has been fully deployed. Absence of the drift bar after deployment of the tubing, therefore, indicates that an inner diameter of the tubing is restrictive and should be pulled out of hole. In some implementations, the drift bar is hollow. In some implementations, the drift bar is made of a breakable material, such as ceramic.

The subject matter described in this disclosure can be implemented in particular implementations, so as to realize one or more of the following advantages. The drift bar and methods described here can be implemented to perform pipe drifting operations in a well without requiring the use of a slick line or wireline, which can save both equipment costs and pipe installation time. Because the drift bar floats in the well, the risk of leaving a fish in the wellbore due to pipe drifting operations can be mitigated and/or eliminated. The drift bar and methods described here can be implemented to reduce and/or eliminate time lost to pulling multiple joints out of hole, for example, due to crimping or over-torqued pipe because each joint can be drifted individually as each tubular is installed in the well.

Figure 1:
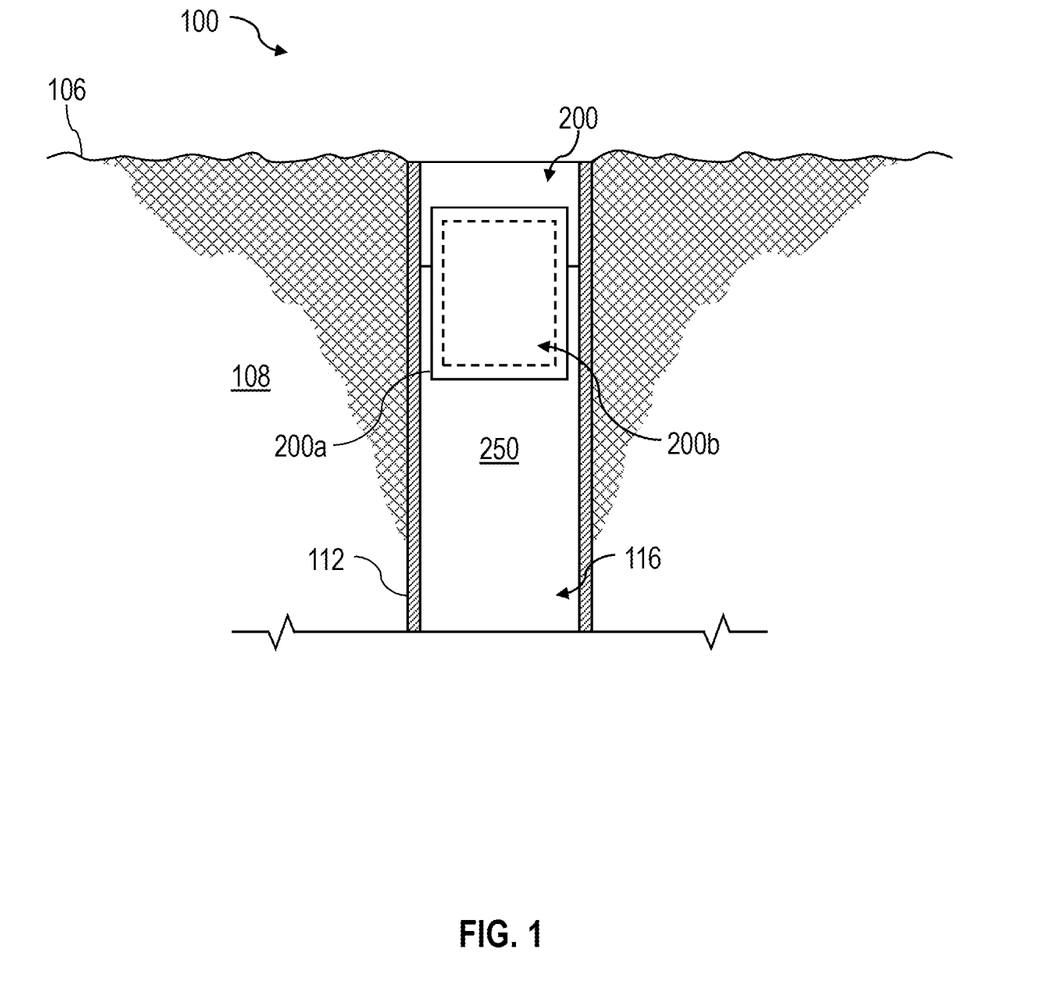
FIG. 1 is a schematic diagram of an example well.

FIG. 1 depicts an example well 100 constructed in accordance with the concepts herein. The well 100 extends from the surface 106 through the Earth 108 to one more subterranean zones of interest. The well 100 enables access to the subterranean zones of interest to allow recovery (that is, production) of fluids to the surface 106 and, in some implementations, additionally or alternatively allows fluids to be placed in the Earth 108. In some implementations, the subterranean zone is a formation within the Earth 108 defining a reservoir, but in other instances, the zone can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In some implementations, the casing 112 is omitted or ceases in the region of the subterranean zone of interest. This portion of the well 100 without casing is often referred to as "open hole." In particular, casing 112 is commercially produced in a number of common sizes specified by the American Petroleum Institute (the "API"), including 4½, 5, 5½, 6, 6⅝, 7, 7⅝, 7¾, 8⅝, 8¾, 9⅝, 9¾, 9⅞, 10¾, 11¾, 11⅞, 13⅜, 13½, 13⅝, 16, 18⅝, and 20 inches, and the API specifies internal diameters for each casing size.

A drift bar 200 can be used to drift tubulars (such as the casing 112) as they are installed in the well 100. Using the drift bar 200 can ensure that the tubulars being installed in the well 100 have sufficient drift diameters to allow for downhole tools and casing strings to be installed through the tubulars that have been installed. At times (for example, while tubulars are being installed in the well 100), the well 100 is at least partially filled with a wellbore fluid 250. The wellbore fluid 250 can include, for example, fluid that naturally exists within the subterranean formation in which the wellbore is formed. The wellbore fluid 250 can include, for example, fluid that is injected into the wellbore (such as drilling fluid). The drift bar 200 has a density that is less than a density of the wellbore fluid 250 residing in the well 100. Thus, the drift bar 200 tends to float on the surface of the wellbore fluid 250 residing in the well 100.

The drift bar 200 can be configured to withstand and operate for extended periods of time (for example, multiple hours, days, weeks, months, or years) at the typical operating conditions (temperature and pressure) experienced downhole within the wellbore of the well 100, which temperatures can exceed 400 degrees Fahrenheit (° F.)/205 degrees Celsius (° C.) and pressures over 2,000 pounds per square inch gauge (psig). In terms of mechanical strength against deformation, the drift bar 200 is more brittle than it is ductile. That is, the drift bar 200 tends to fracture/break as opposed to deform plastically in response to tensile loading. In some implementations, the drift bar 200 includes a ceramic material 200a that encases a buoyancy fluid 200b. The buoyancy fluid 200b has a density that is less than the density of the wellbore fluid 250 residing in the well 100. In some implementations, the buoyancy fluid 200b includes air. In some implementations, the buoyancy fluid 200b includes an inert gas, such as nitrogen. In some implementations, the ceramic material 200a includes zirconia, alumina, silicon, nitride, or any combinations of these. In case of an unexpected event (such as the drift bar 200 getting stuck in a tubular due to the presence of a restriction or the tubular being damaged), the drift bar 200 can be broken mechanically (for example, by milling) or hydraulically (for example, by pulsing a fluid), and the broken pieces of the drift bar 200 can be retrieved from the well 100.

In some implementations, the drift bar 200 has a cylindrical shape. In some implementations, the drift bar 200 has a spherical shape. The drift bar 200 can be sized for the particular tubular that is to be installed in the well 100. For example, the drift bar 200 can be sized to drift a 4½, 5, 5½, 6, 6⅝, 7, 7⅝, 7¾, 8⅝, 8¾, 9⅝, 9¾, 9⅞, 10¾, 11¾, 11⅞, 13⅜, 13½, 13⅝, 16, 18⅝, or 20-inch nominal pipe size (NPS) casing specified by the API. The drift bar 200 has an outer diameter that is less than an inner diameter of the tubular that is to be installed in the well 100. In some implementations, the drift bar 200 has an outer diameter that is about 0.25 inches smaller than an inner diameter of the tubular that is to be installed in the well 100. Conversely, the tubular that is to be installed in the well 100 can have an inner diameter that is about 0.25 inches greater than an outer diameter of the drift bar 200. In such implementations, a clearance between an inner bore of the tubular that is to be installed in the well 100 and the drift bar 200 while the drift bar 200 is positioned within the inner bore is about 0.125 inches.

Figure 2A:
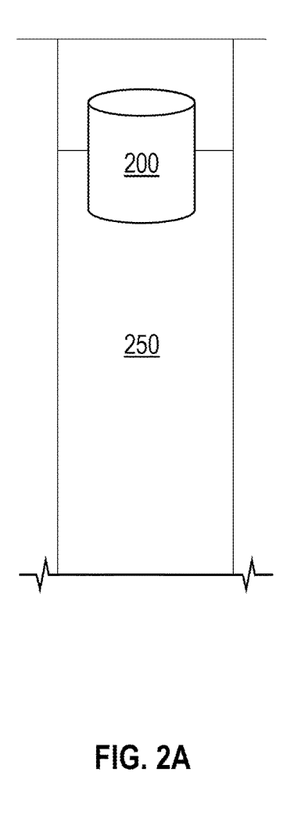
FIGS. 2A, 2B, 2C, 2D, and 2E are schematic diagrams of an example progression of drifting pipes as they are installed in a well.
Figure 2B:
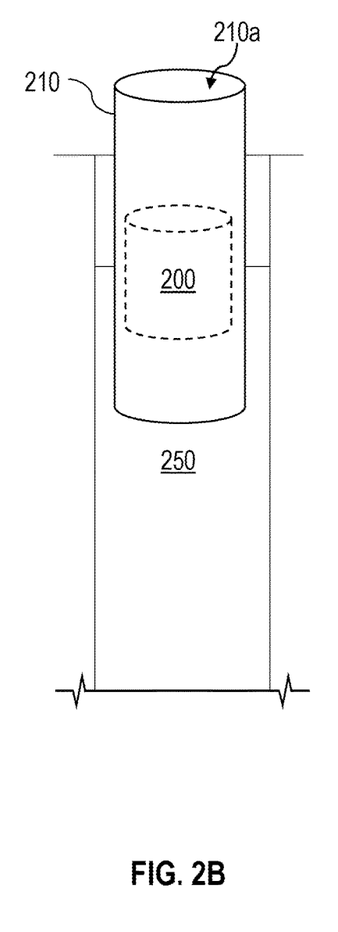
Figure 2C:
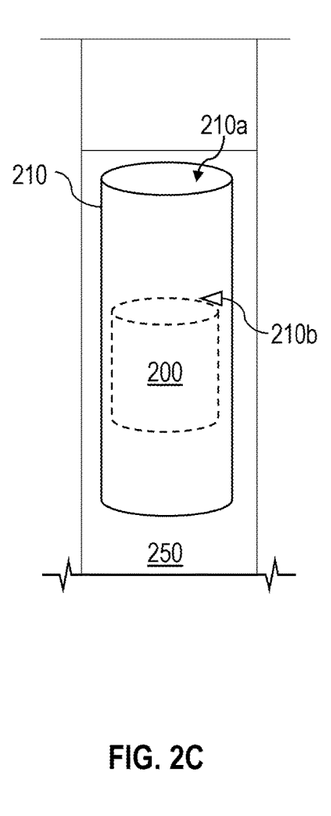
Figure 2D:
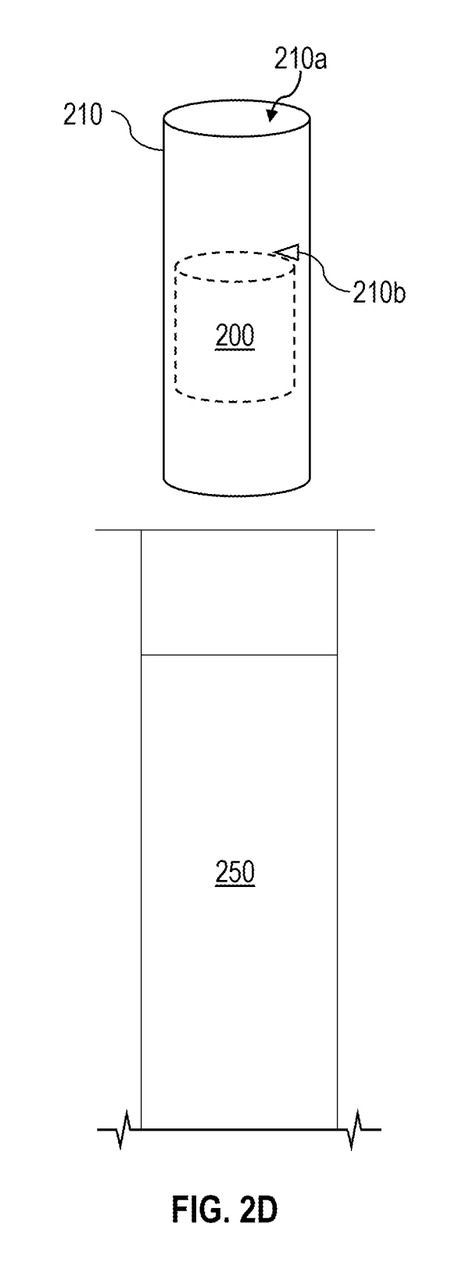
Figure 2E:
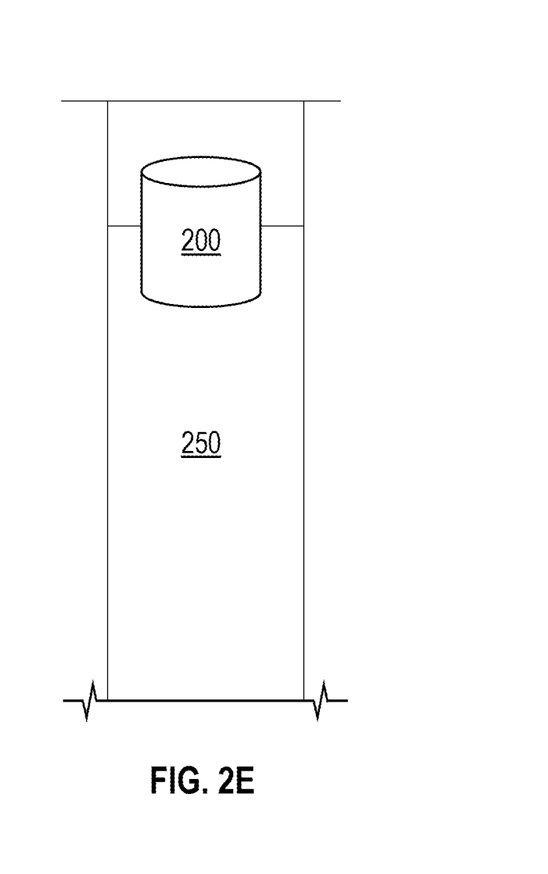

FIGS. 2A, 2B, 2C, 2D, and 2E are schematic diagrams of an example progression of drifting pipes as they are installed in a well, such as the well 100. In FIG. 2A, the drift bar 200 has been lowered into the well 100 and floats at a surface level of the wellbore fluid 250 residing in the well 100. The drift bar 200 tends to float because the drift bar 200 is less dense than the wellbore fluid 250 residing in the well 100. In FIG. 2B, a tubular 210 is being lowered into the well 100. The tubular 210 defines an inner bore 210a. The inner bore 210a has an inner diameter that is greater than an outer diameter of the drift bar 200. The drift bar 200 is positioned to pass through the inner bore 210a of the tubular 210 as the tubular 210 is lowered into the well 100. In FIG. 2C, the tubular 210 has been lowered to below the surface level of the wellbore fluid 250—that is, the tubular 210 is submerged. In this particular case, the tubular 210 has a restriction 210b in the inner bore 210a that is not sufficiently sized to allow passage of the drift bar 200 through the restriction 210b. As such, the drift bar 200 pushes up against the restriction 210b due to its buoyancy and travels with the tubular 210. If the inner bore 210a did not have the restriction 210b, the drift bar 200 would have been able to completely pass through the tubular 210 and remain floating at the surface level of the wellbore fluid 250. However, in this particular case, as shown in FIG. 2C, the drift bar 200 cannot pass through the tubular 210 due to the presence of the restriction 210c, and thus is not seen floating at the surface level of the wellbore fluid 250. In this case, it can be determined that the restriction 210c is present in the tubular 210. This is a sign that the tubular 210 should be removed from the well 100. In FIG. 2D, the tubular 210 has been pulled out of the well 100. In some cases, the drift bar 200 falls out of the tubular 210 naturally via gravity. In other cases, the drift bar 200 remains stuck in the tubular 210. In such cases, the drift bar 200 can be removed, for example, manually. In some cases, the tubular 210 can be repaired to remove the restriction 210b, and then the tubular 210 can be re-lowered into the well 100 to be installed. In some cases, the tubular 210 is discarded, and a different tubular can be lowered into the well 100 to be installed. In FIG. 2E, the drift bar 200 has been re-lowered into the well 100 to perform pipe drifting an the next tubular that is to be installed in the well 100 (for example, the repaired tubular 210 or a different tubular).

Figure 3A:
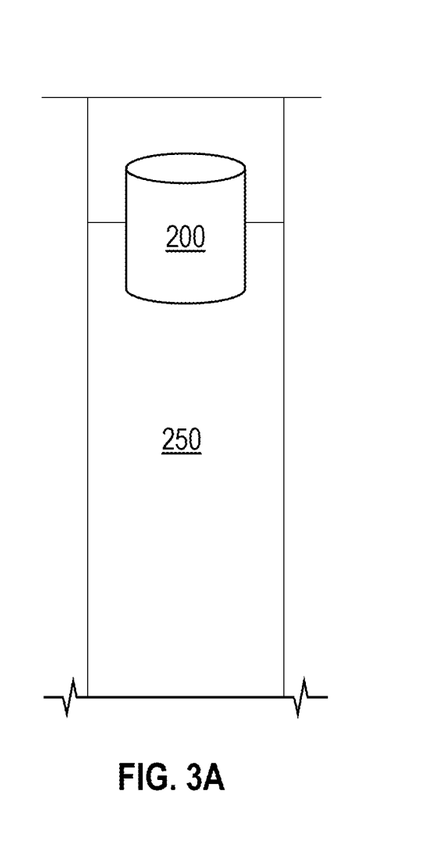
FIGS. 3A, 3B, 3C, and 3D are schematic diagrams of an example progression of drifting pipes as they are installed in a well.
Figure 3B:
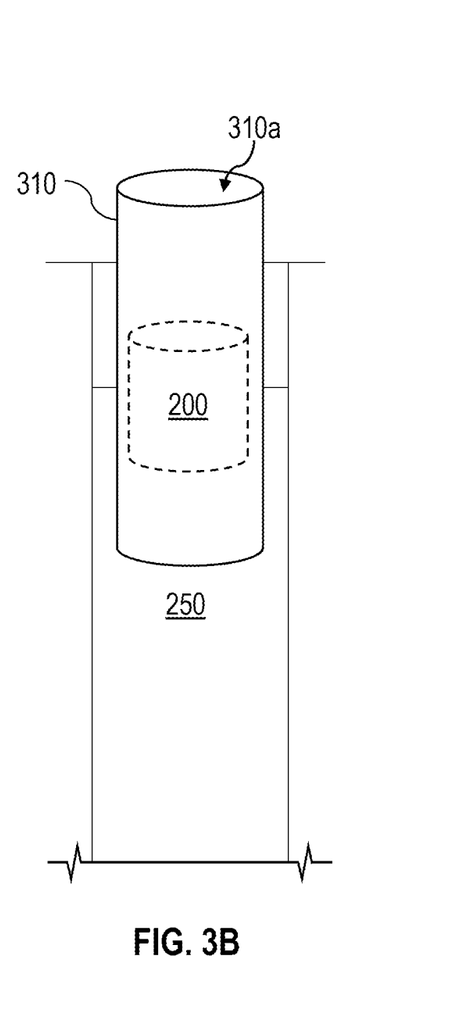
Figure 3C:
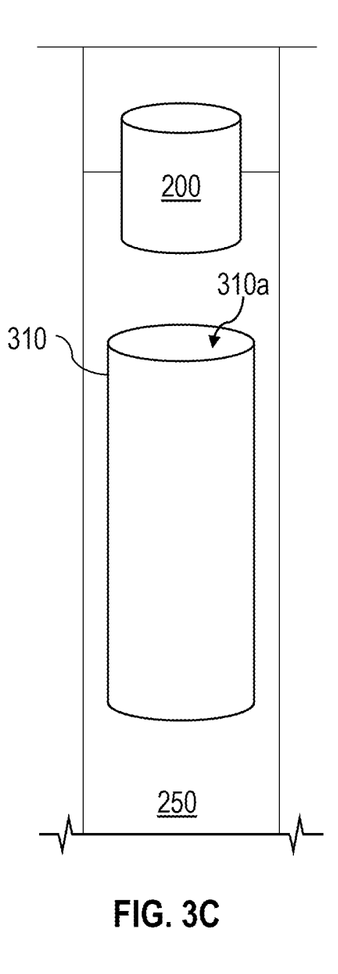
Figure 3D:
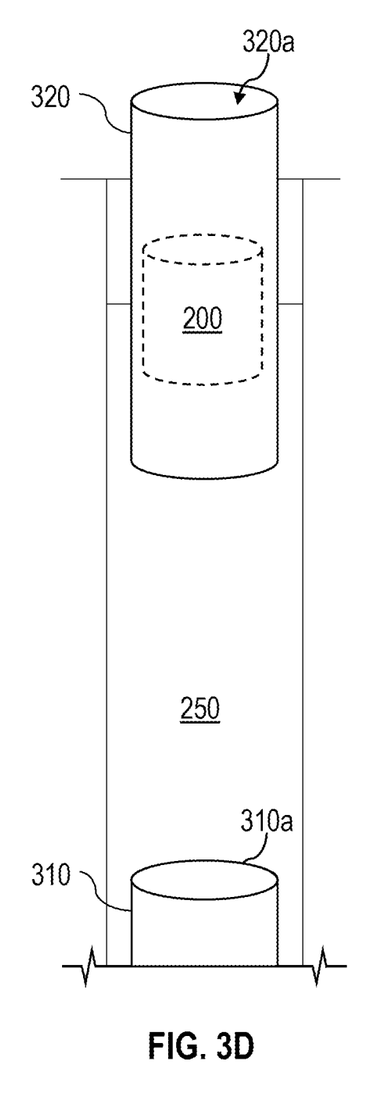

FIGS. 3A, 3B, 3C, and 3D are schematic diagrams of an example progression of drifting pipes as they are installed in a well, such as the well 100. In FIG. 3A, the drift bar 200 has been lowered into the well 100 and floats at a surface level of the wellbore fluid 250 residing in the well 100. The drift bar 200 tends to float because the drift bar 200 is less dense than the wellbore fluid 250 residing in the well 100. In FIG. 3B, a tubular 310 is being lowered into the well 100. The tubular 310 defines an inner bore 310a. The inner bore 310a has an inner diameter that is greater than an outer diameter of the drift bar 200. The drift bar 200 is positioned to pass through the inner bore 310a of the tubular 310 as the tubular 310 is lowered into the well 100. In FIG. 3C, the tubular 310 has been lowered to below the surface level of the wellbore fluid 250—that is, the tubular 310 is submerged. In this particular case, the tubular 310 is free of any restrictions in the inner bore 310a that are insufficiently sized to allow passage of the drift bar 200 through the restriction 310b. As such, the drift bar 200 completely passes through the inner bore 310a of the tubular 310 and remains floating at the surface level of the wellbore fluid 250. In this case, it can be determined that there are no restrictions (like the restriction 210c in relation to the progression shown in FIGS. 2A-2E) present in the tubular 310 that are insufficiently sized to allow passage of the drift bar 200 through the inner bore 310a. This is a sign that the tubular 310 can continue on to be installed in the well 100. In FIG. 3D, a second tubular 320 is being lowered into the well 100 to be installed in the well 100, and the drift bar 200 floating at the surface level of the wellbore fluid 250 is ready to continue perform pipe drifting operations as the second tubular 320 is being deployed. Similar to the tubular 310, the second tubular 320 defines a second inner bore 320a. The second inner bore 320a has an inner diameter that is greater than an outer diameter of the drift bar 200. The drift bar 200 is positioned to pass through the second inner bore 320a of the second tubular 320 as the second tubular 320 is lowered into the well 100.

Figure 4A:
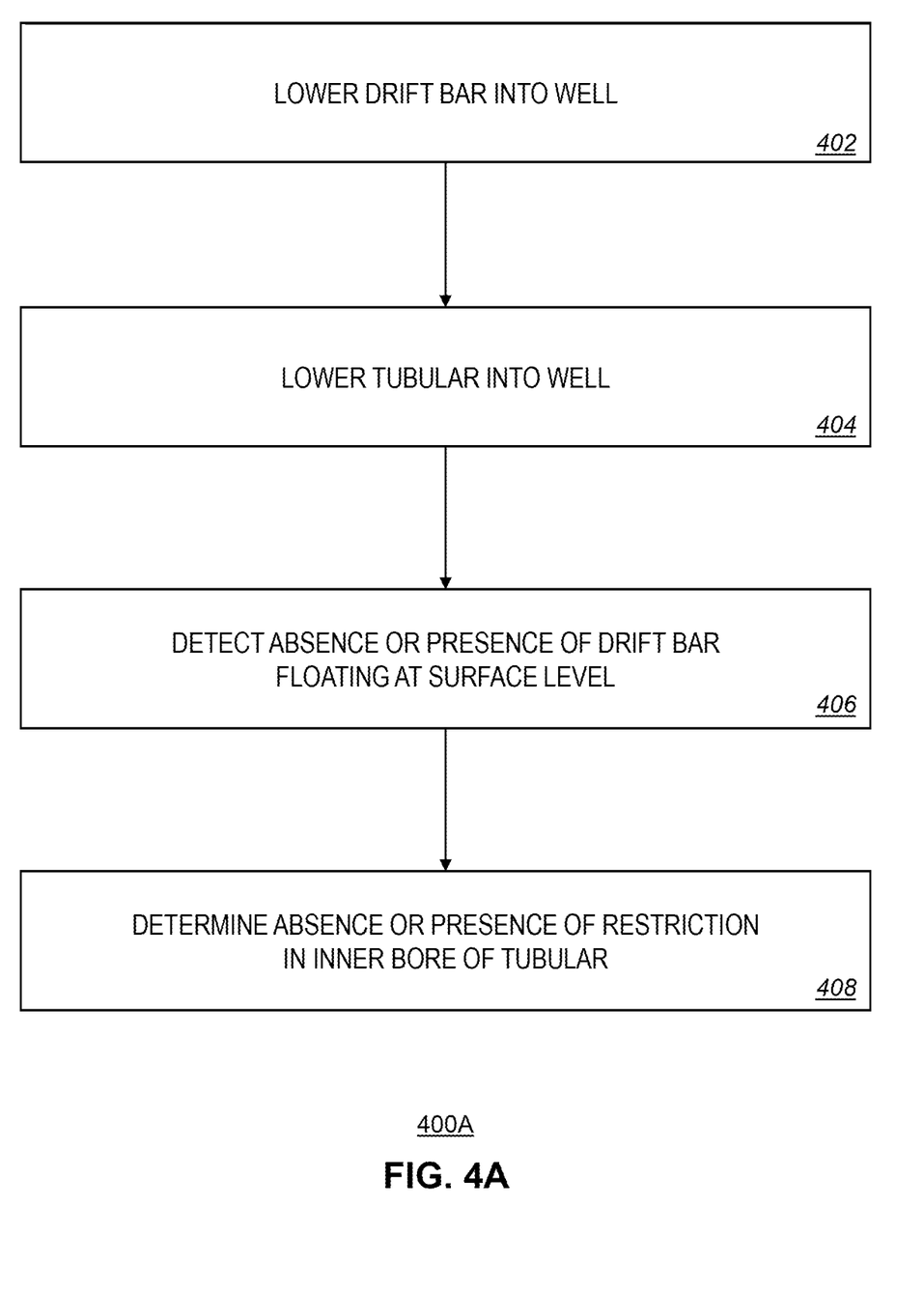
FIG. 4A is a flow chart of an example method for drifting pipes as they are installed in a well.

FIG. 4A is a flow chart of an example method 400A for drifting pipes as they are installed in a well, such as the well 100. At block 402, a drift bar (such as the drift bar 200) is lowered into the well 100. As described previously, the drift bar 200 has a density that is less than a density of a wellbore fluid (such as the wellbore fluid 250) residing in the well 100. Thus, the drift bar 200 tends to float at a surface level in the well 100. In some implementations, the drift bar 200 is made of a ceramic material (such as the ceramic material 200a) that encases a buoyancy fluid (such as the buoyancy fluid 200b) having a density that is less than the density of the wellbore fluid 250 residing in the well 100. In some implementations, the method 400A includes forming the drift bar 200 (prior to block 402) by encasing the buoyancy fluid 200b within the ceramic material 200a. At block 404, a tubular (such as the tubular 210) is lowered into the well 100 below the surface level. As described previously, the tubular 210 defines an inner bore 210a that has an inner diameter that is greater than an outer diameter of the drift bar 200. The drift bar 200 is positioned to pass through the inner bore 210a of the tubular 210, as the tubular 210 is lowered into the well 100 at block 404. After the tubular 210 is positioned below the surface level (as a result of block 404), an absence or presence of the drift bar 200 floating at the surface level is detected at block 406. The detection of the drift bar 200 at block 406 can be performed, for example, visually by an operator, by obtaining image and/or video data of the surface level, by location detection (such as by radio-frequency identification), or any combination of these. At block 408, an absence or presence of a restriction (such as the restriction 210b) in the inner bore 210a of the tubular 210 is determined in response to detecting the presence or absence, respectively, of the drift bar 200 floating at the surface level (block 406). For example, if it is detected at block 406 that the drift bar 200 is not floating at the surface level (drift bar 200 absent at surface level), then it is determined at block 408 that the restriction 210b is present in the inner bore 210a of the tubular 210. In such cases, the tubular 210 should be pulled out of the well 100 and repaired and/or replaced. An example progression is shown by FIGS. 2A-2E. As another example, if it is detected at block 406 that the drift bar 200 remains floating at the surface level (drift bar 200 present at surface level), then it is determined at block 408 that a restriction (like the restriction 210b) is absent in the inner bore 210a of the tubular 210. In such cases, a second tubular (such as the second tubular 320) can be installed in the well 100. An example progression is shown by FIGS. 3A-3D.

Figure 4B:
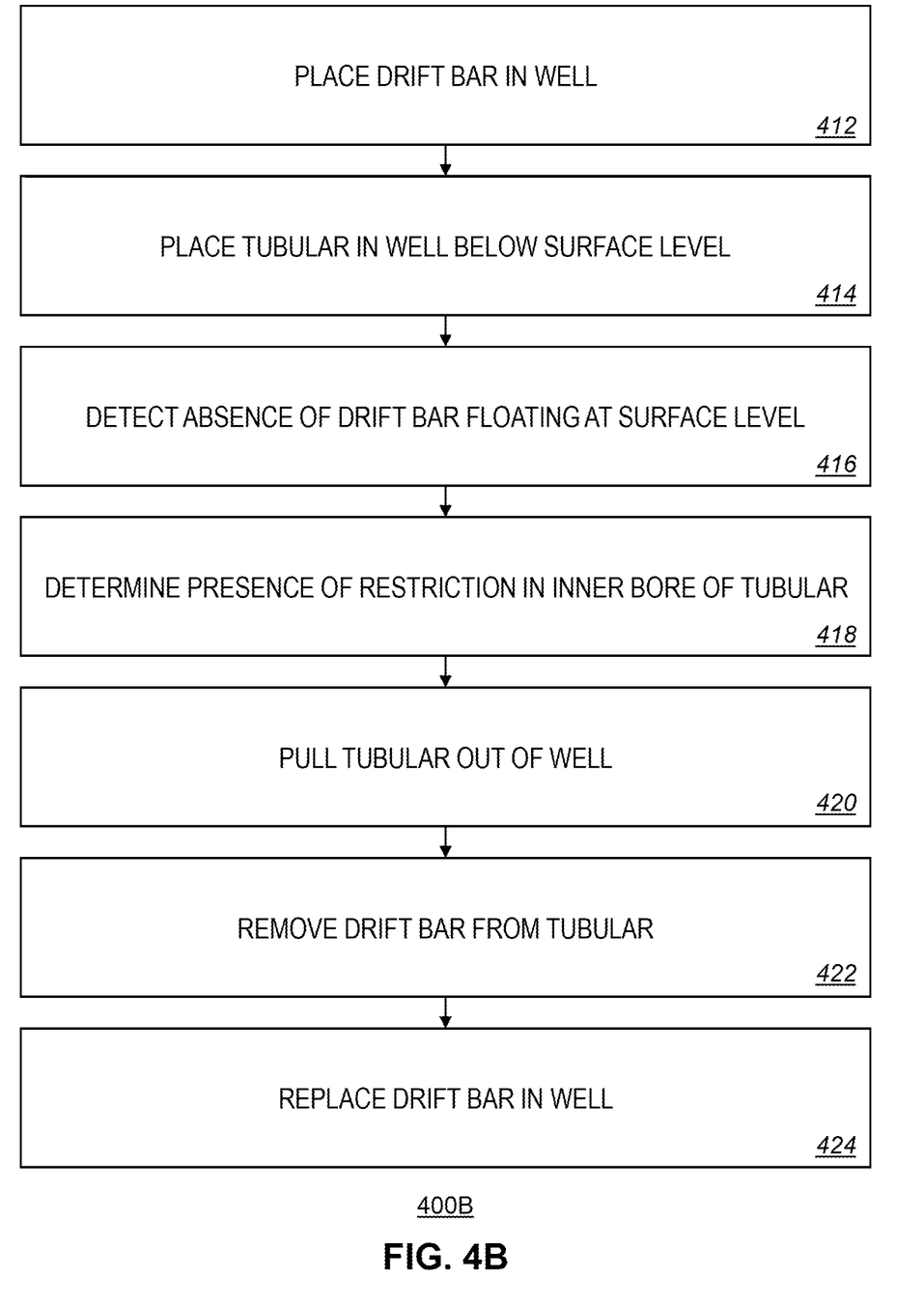
FIG. 4B is a flow chart of an example method for drifting pipes as they are installed in a well.

FIG. 4B is a flow chart of an example method 400B for drifting pipes as they are installed in a well, such as the well 100. At block 412, a drift bar (such as the drift bar 200) is placed in (for example, lowered into) the well 100. As described previously, the drift bar 200 has a density that is less than a density of a wellbore fluid (such as the wellbore fluid 250) residing in the well 100. Thus, the drift bar 200 tends to float at a surface level in the well 100. In some implementations, the drift bar 200 is made of a ceramic material (such as the ceramic material 200a) that encases a buoyancy fluid (such as the buoyancy fluid 200b) having a density that is less than the density of the wellbore fluid 250 residing in the well 100. In some implementations, the method 400B includes forming the drift bar 200 (prior to block 412) by encasing the buoyancy fluid 200b within the ceramic material 200a. At block 414, a tubular (such as the tubular 210) is placed in (for example, lowered into) the well 100 below the surface level. As described previously, the tubular 210 defines an inner bore 210a that has an inner diameter that is greater than an outer diameter of the drift bar 200. The drift bar 200 is positioned to pass through the inner bore 210a of the tubular 210, as the tubular 210 is placed in the well 100 at block 414. After the tubular 210 is positioned below the surface level (as a result of block 414), an absence of the drift bar 200 floating at the surface level is detected at block 416. The detection of the drift bar 200 at block 416 can be performed, for example, visually by an operator, by obtaining image and/or video data of the surface level, by location detection (such as by radio-frequency identification), or any combination of these. At block 418, a presence of a restriction (such as the restriction 210b) in the inner bore 210a of the tubular 210 is determined in response to detecting the absence of the drift bar 200 floating at the surface level (block 416). After determining the presence of the restriction 210b in the inner bore 210a of the tubular 210 at block 418, the tubular 210 is pulled out of the well 100 at block 420. At block 422, the drift bar 200 is removed from the tubular 210. In some cases, the drift bar 200 falls out of the tubular 210 due to the effects of gravity. In some cases, the drift bar 200 is manually removed from the tubular 210. At block 424, the drift bar 200 is replaced in (for example, lowered back into) the well 100. In some implementations, the tubular 210 is repaired and re-installed into the well 100. In some implementations, a different tubular is installed into the well 100 in place of the tubular 210. An example progression is shown by FIGS. 2A-2E.

Figure 4C:
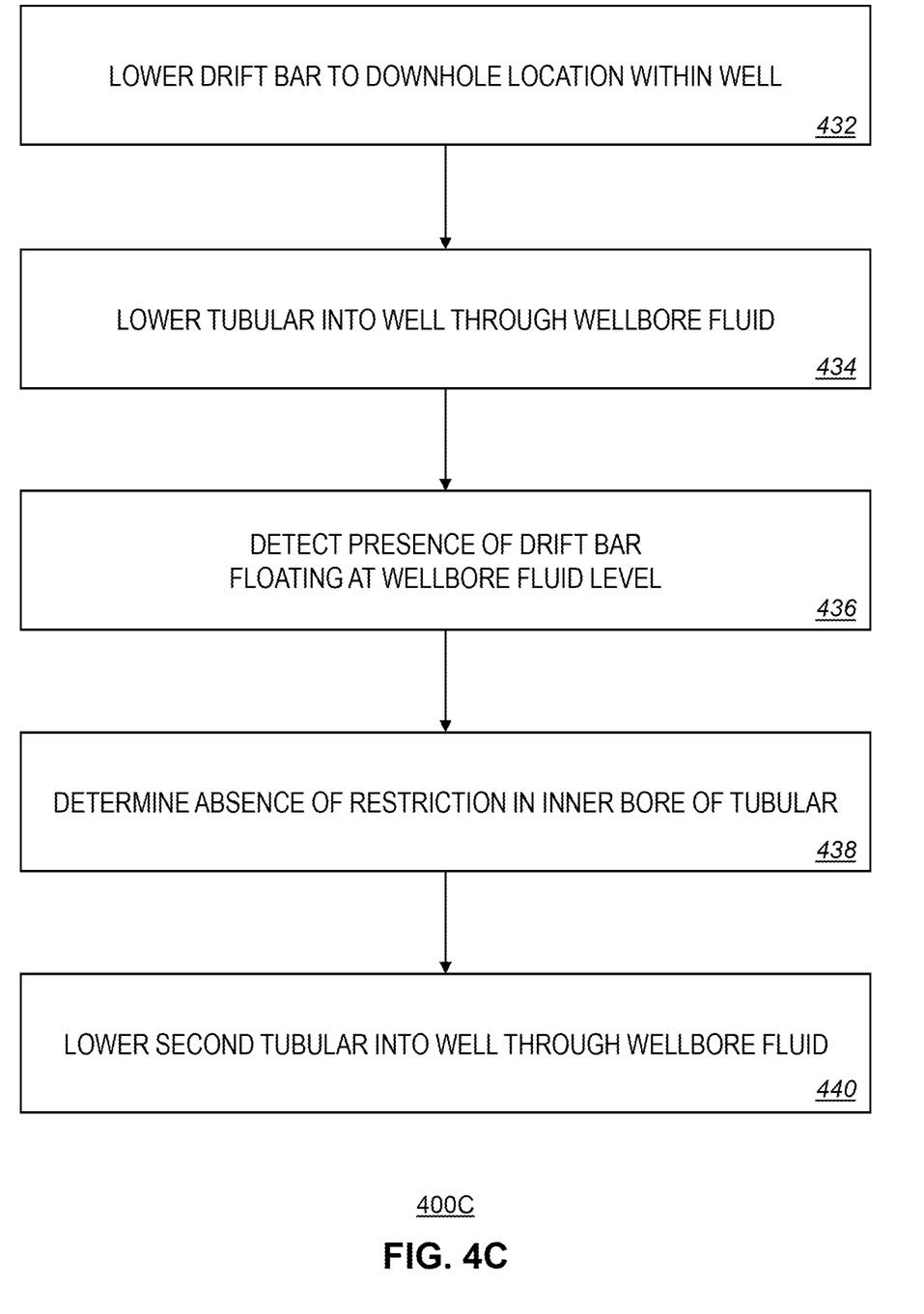
FIG. 4C is a flow chart of an example method for drifting pipes as they are installed in a well.

FIG. 4C is a flow chart of an example method 400C for drifting pipes as they are installed in a well, such as the well 100. At block 432, a drift bar (such as the drift bar 200) is lowered into the well 100. As described previously, the drift bar 200 has a density that is less than a density of a wellbore fluid (such as the wellbore fluid 250) residing in the well 100. Thus, the drift bar 200 tends to float at a surface level in the well 100. In some implementations, the drift bar 200 is made of a ceramic material (such as the ceramic material 200a) that encases a buoyancy fluid (such as the buoyancy fluid 200b) having a density that is less than the density of the wellbore fluid 250 residing in the well 100. In some implementations, the method 400C includes forming the drift bar 200 (prior to block 432) by encasing the buoyancy fluid 200b within the ceramic material 200a. At block 434, a tubular (such as the tubular 310) is lowered into the well 100 through the wellbore fluid 250. The tubular 310 is sized to allow the drift bar 200 to rise in an uphole direction through the wellbore fluid 250 within the tubular 310 to a wellbore fluid level within the well 100. For example, the tubular 310 defines an inner bore 310a that has an inner diameter that is greater than an outer diameter of the drift bar 200. The drift bar 200 can be positioned to pass through the inner bore 310a of the tubular 310, as the tubular 310 is lowered into the well 100 at block 434. After the tubular 310 is lowered at block 434, a presence of the drift bar 200 floating at the wellbore fluid level is detected at block 436. The detection of the drift bar 200 at block 436 can be performed, for example, visually by an operator, by obtaining image and/or video data of the surface level, by location detection (such as by radio-frequency identification), or any combination of these. At block 438, an absence of a restriction (like the restriction 210b) in the inner bore 310a of the tubular 310 is determined in response to detecting the presence of the drift bar 200 floating at the wellbore fluid level (block 436). After determining the absence of the restriction at block 438, a second tubular (such as the second tubular 320) is lowered into the well 100 at block 440. Similar to the tubular 310, the second tubular 320 defines a second inner bore 320a that is sized to allow the drift bar 200 to rise in the uphole direction through the wellbore fluid 250 within the second tubular 320 to the wellbore fluid level within the well 100. An example progression is shown by FIGS. 3A-3D.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    lowering a drift bar into a well formed in a subterranean formation, the drift bar having a density less than a density of a wellbore fluid residing in the well;
    lowering a tubular into the well below a surface level of the wellbore fluid residing in the well, wherein the tubular defines an inner bore having an inner diameter that is greater than an outer diameter of the drift bar, and the drift bar is positioned to pass through the inner bore of the tubular as the tubular is lowered into the well;
    after the tubular is positioned below the surface level, detecting an absence or presence of the drift bar floating at the surface level; and
    determining an absence or presence of a restriction in the inner bore of the tubular in response to detecting the presence or absence, respectively, of the drift bar floating at the surface level.

2. The method of claim 1, comprising pulling the tubular out of the well in response to determining the presence of the restriction in the inner bore of the tubular.

3. The method of claim 2, comprising removing the drift bar from the tubular and replacing the drift bar in the well.

4. The method of claim 3, wherein the inner diameter of the inner bore is about 0.25 inches greater than the outer diameter of the drift bar, such that a clearance between the inner bore and the drift bar while the drift bar is positioned within the inner bore is about 0.125 inches.

5. The method of claim 4, wherein the restriction in the inner bore of the tubular has a dimension less than or equal to the outer diameter of the drift bar, such that the restriction prevents passage of the drift bar.

6. The method of claim 5, wherein the drift bar is made of a ceramic material encasing a buoyancy fluid having a density less than the density of the wellbore fluid residing in the well, and the method comprises forming the drift bar by encasing the buoyancy fluid within the ceramic material.

7. The method of claim 6, wherein the buoyancy fluid comprises air.

8. The method of claim 6, wherein the ceramic material comprises zirconia, alumina, silicon nitride, or any combinations thereof.

9. A method comprising:
placing a drift bar in a well formed in a subterranean formation, the drift bar having a density less than a density of a wellbore fluid residing in the well, such that the drift bar tends to float at a surface level in the well;
placing a tubular in the well below the surface level, wherein the tubular defines an inner bore having an inner diameter that is greater than an outer diameter of the drift bar, and the drift bar is positioned to pass through the inner bore of the tubular as the tubular is placed in the well;
after the tubular is positioned below the surface level, detecting an absence of the drift bar at the surface level;
determining a presence of a restriction in the inner bore of the tubular in response to detecting the absence of the drift bar at the surface level;
after determining the presence of the restriction in the inner bore of the tubular, pulling the tubular out of the well;
removing the drift bar from the tubular; and
replacing the drift bar in the well.

10. The method of claim 9, wherein the inner diameter of the inner bore is about 0.25 inches greater than the outer diameter of the drift bar, such that a clearance between the inner bore and the drift bar while the drift bar is positioned within the inner bore is about 0.125 inches.

11. The method of claim 10, wherein the restriction in the inner bore of the tubular has a dimension less than or equal to the outer diameter of the drift bar, such that the restriction prevents passage of the drift bar.

12. The method of claim 11, wherein the drift bar is made of a ceramic material encasing a buoyancy fluid having a density less than the density of the wellbore fluid residing in the well.

13. The method of claim 12, wherein the buoyancy fluid comprises air.

14. The method of claim 12, wherein the ceramic material comprises zirconia, alumina, silicon nitride, or any combinations thereof.

15. A method comprising:
lowering a drift bar to a downhole location within a well formed in a subterranean formation, the well at least partially filled with a wellbore fluid, the drift bar having a density less than a density of the wellbore fluid;
lowering a tubular into the well through the wellbore fluid, wherein the tubular defines an inner bore sized to allow the drift bar to rise in an uphole direction through the wellbore fluid within the tubular to a wellbore fluid level within the well;
after lowering the tubular, detecting a presence of the drift bar floating at the wellbore fluid level;
determining an absence of a restriction in the inner bore of the tubular in response to detecting the presence of the drift bar floating at the wellbore fluid level; and
after determining the absence of the restriction in the inner bore of the tubular, lowering a second tubular into the well through the wellbore fluid, wherein the second tubular defines a second inner bore sized to allow the drift bar to rise in the uphole direction through the wellbore fluid within the second tubular to the wellbore fluid level within the well.

16. The method of claim 15, wherein the inner diameter of the inner bore is about 0.25 inches greater than the outer diameter of the drift bar, such that a clearance between the inner bore and the drift bar while the drift bar is positioned within the inner bore is about 0.125 inches, and the second inner diameter of the second inner bore is about 0.25 inches greater than the outer diameter of the drift bar, such that a second clearance between the second inner bore and the drift bar while the drift bar is positioned within the second inner bore is about 0.125 inches.

17. The method of claim 16, wherein the drift bar is made of a ceramic material encasing a buoyancy fluid having a density less than the density of the wellbore fluid residing in the well.

18. The method of claim 17, wherein the buoyancy fluid comprises air.

19. The method of claim 17, wherein the ceramic material comprises zirconia, alumina, silicon nitride, or any combinations thereof.

20. The method of claim 19, comprising:
after lowering the second tubular, detecting an absence or presence of the drift bar floating at the wellbore fluid level; and
determining an absence or presence of a second restriction in the second inner bore of the second tubular in response to detecting the presence or absence, respectively, of the drift bar floating at the wellbore fluid level.

* * * * *